United States Patent
Hadas et al.

(10) Patent No.: US 9,206,735 B2
(45) Date of Patent: Dec. 8, 2015

(54) ACTUATOR AND VALVE LINKAGE (75) Inventors: Rostislav Hadas, Koprivnice (CZ); Petr Cizek, Brno (CZ); Milen Mihaylov, Brno (CZ); Martin Prasek, Brno (CZ); Didier Horlaville, Laneuveville-devant Nancy (FR)

(73) Assignee: Honeywell International Inc., Morris Plains, NJ (US)

( * ) Notice: Subject to any disclaimer, the term of this patent is extended or adjusted under 35 U.S.C. 154(b) by 538 days.

(21) Appl. No.: 13/564,844

(22) Filed: Aug. 2, 2012

(65) Prior Publication Data
US 2014/0037433 A1  Feb. 6, 2014

(51) Int. Cl.
F02D 23/00 (2006.01)
F01D 17/12 (2006.01)
F16H 21/44 (2006.01)
F16H 21/54 (2006.01)
F02B 37/18 (2006.01)

(52) U.S. Cl.
CPC ............. *F02B 37/186* (2013.01); *Y02T 10/144* (2013.01); *Y10T 74/18888* (2015.01)

(58) Field of Classification Search
CPC ............ F02B 37/186; Y10T 74/18888; Y02T 10/144
USPC ........................ 60/602; 415/148, 160; 74/99 R
IPC ... F01D 17/16; F02D 9/04, 11/04; F02B 37/18; F16C 7/06
See application file for complete search history.

(56) References Cited

U.S. PATENT DOCUMENTS

| | | | | |
|---|---|---|---|---|
| 2,646,139 A | * | 7/1953 | Dorey | 188/202 |
| 3,269,464 A | * | 8/1966 | Smelcer | 172/10 |
| 4,934,500 A | * | 6/1990 | Hanks et al. | 192/56.33 |
| 6,193,433 B1 | * | 2/2001 | Gutierrez et al. | 403/325 |
| 6,698,967 B2 | * | 3/2004 | Henrich et al. | 403/325 |
| 2008/0115622 A1 | * | 5/2008 | Uhl et al. | 74/592 |
| 2010/0089055 A1 | * | 4/2010 | Severin | 60/602 |
| 2011/0099999 A1 | * | 5/2011 | Natali | 60/602 |
| 2011/0185725 A1 | | 8/2011 | Dettmann et al. | |
| 2011/0291036 A1 | * | 12/2011 | Yamanaka et al. | 251/251 |
| 2012/0117966 A1 | * | 5/2012 | Boening et al. | 29/889.1 |
| 2012/0216534 A1 | | 8/2012 | Werstat et al. | |

(Continued)

FOREIGN PATENT DOCUMENTS

| | | | | |
|---|---|---|---|---|
| DE | 202004004407 U1 | * | 8/2004 | F16B 7/10 |
| DE | 102009057161 A1 | * | 6/2011 | F02B 37/18 |

(Continued)

OTHER PUBLICATIONS

EPO Report Appl. No. 13177460.6-1606/2693016, Jun. 11, 2014 (5 pages).

(Continued)

*Primary Examiner* — Thai Ba Trieu
(74) *Attorney, Agent, or Firm* — Brian J. Pangrle (57) ABSTRACT A system can include a linkage that includes a turnbuckle component fixed between extensions of a rod end, a turbine assembly that includes a rotatable wastegate poppet arm connected to a pivotable wastegate valve control arm coupled to the rod end of the linkage by a peg, and an actuator that includes a translatable rod connected to the turnbuckle component of the linkage to pivot the wastegate valve control arm and rotate the wastegate poppet arm. Various other examples of devices, assemblies, systems, methods, etc., are also disclosed.

18 Claims, 8 Drawing Sheets

(56) References Cited

U.S. PATENT DOCUMENTS

2013/0255250 A1 * 10/2013 Naunheim et al. .............. 60/602
2015/0000127 A1    1/2015 Werstat et al.

FOREIGN PATENT DOCUMENTS

| | | | |
|---|---|---|---|
| DE | 102010004559 A1 | 7/2011 | |
| EP | 2473724 B1 | 4/2014 | |
| FR | 2823795 A1 * | 10/2002 | .............. F02B 37/18 |
| WO | 2004053299 A1 | 6/2004 | |
| WO | 2007044012 A1 | 4/2007 | |
| WO | 2012034843 A1 | 3/2012 | |

OTHER PUBLICATIONS

EPO Search Report Appl. No. 13177460.6-1606/2693016, May 2, 2014 (3 pages).

* cited by examiner

ACTUATOR AND VALVE LINKAGE

TECHNICAL FIELD

Subject matter disclosed herein relates generally to exhaust turbines for internal combustion engines.

BACKGROUND

An exhaust system of an internal combustion engine can include a turbine wheel set in a turbine housing to create backpressure. In such a system, as the pressurized exhaust passes through the turbine housing (e.g., en route to an atmospheric outlet), the turbine wheel harnesses energy as the exhaust expands. Where the turbine wheel provides for rotation of a compressor wheel, the compressor wheel may compress intake air for the internal combustion engine, often referred to as boost.

A turbine assembly may include one or more features that can help control exhaust pressure and exhaust flow. For example, a turbine assembly may include a wastegate valve, a variable geometry mechanism, or both. As to a wastegate valve, in an open position, it can allow exhaust from an internal combustion engine to bypass a turbine wheel (e.g., to limit compressor boost). As to a variable geometry mechanism, it can act to alter geometry of vanes, nozzles, etc., that define a throat or throats that deliver exhaust form an internal combustion engine to a turbine wheel.

As exhaust gases can reach temperatures in excess of 500° C., an actuator for a wastegate valve or for a variable geometry mechanism may be located at a distance from a turbine housing. As such, a linkage may be provided that extends from an actuator to a component or components to be controlled. Various technologies, techniques, etc., described herein pertain to linkages for controlling a component or components of a turbine assembly.

BRIEF DESCRIPTION OF THE DRAWINGS

A more complete understanding of the various methods, devices, assemblies, systems, arrangements, etc., described herein, and equivalents thereof, may be had by reference to the following detailed description when taken in conjunction with examples shown in the accompanying drawings where.

DETAILED DESCRIPTION

Assembling a turbocharger involves aligning various components. Where a turbocharger includes controllable features such as a wastegate valve, a variable geometry mechanism, etc., proper alignment can help ensure proper operation of such features.

As an example, a turbocharger assembly process involves a succession of actions where a turbine wheel and integral shaft are initially assembled with a center housing in combination with appropriate journal and thrust bearing components and then a compressor wheel (e.g. impeller) is attached to the shaft to produce a center housing rotating assembly (CHRA). In such an example, the CHRA is subsequently coupled with appropriate turbine and compressor housing components to complete the turbocharger construction.

To couple a turbine housing to a CHRA, as an example, a joint between the turbine housing and center housing of the CHRA may be secured by a clamp with a circular shape. Such a clamp is usually flexible or expandable and may have a V-shaped cross-section that acts to force two components toward each other upon tensioning of the clamp. Sometimes a clamp with a V-shaped cross-section is referred to as a "v-band". Prior to final tightening of a v-band clamp, fine incremental adjustment of an angle between the turbine housing and the CHRA may occur, for example, to more effectively align a control mechanism or one or more associated features.

Where a turbocharger includes a compressor housing, a center housing and a turbine housing with an internal wastegate valve, an actuator for the wastegate valve may be mounted to, for example, the compressor housing, the center housing or both the compressor housing and the center housing. In such a manner, an actuator can be spaced some distance from the turbine housing to reduce heat transfer from the turbine housing (e.g., which may reach temperatures in excess of 500° C.) to the actuator. As an example, a turbine housing with an internal wastegate valve may include a pivotable wastegate valve control arm to which an actuator rod of the actuator links. In such an example, given that the actuator is not located directly on the turbine housing, angular alignment of the actuator, actuator rod and control arm may be achieved, in part, by fine incremental adjustment of an angle between the turbine housing and the CHRA prior to final fixation of the turbine housing with respect to the CHRA (e.g., final tightening of a v-band clamp or other mechanism).

In the foregoing example, the CHRA, the compressor housing and the turbine housing may be defined by a cylindrical coordinate system (r, z, Θ) having a longitudinal axis defined by a rotational axis of the shaft of the CHRA while the actuator, actuator rod and the wastegate valve control arm may be defined by a Cartesian coordinate system (u, v, w). Alignment of various components that make up an actuator and valve linkage may occur via rotational adjustments in the cylindrical coordinate system as well as by adjustments in the Cartesian coordinate system. While the various types of adjustments can allowing for alignment accuracy of an actuator and valve linkage, achieving and maintaining accuracy can be a challenge. Further, an ability to achieve and maintain alignment can be impacted by tolerances, stack-up, etc., of linked components.

Consequences of misalignment between an actuator and wastegate valve control arm, whether resulting from less than optimal assembly or some after assembly cause, can include increased wear, which may have compounding effect(s) detrimental to controllability and performance.

Various technologies, techniques, etc., are described herein that pertain to alignment of linked components, for example, for control of a wastegate valve. As an example, misalignment between a linear electric actuator and a wastegate crank mechanism during assembly process can be reduced through use of two components having particular shapes where the two components are positioned with respect to each other as part of a linkage and thereafter joined, for example, by a laser welding process. In such an example, the complimentary shapes of the two components allows for spatial compensations that can provide for an in situ calibration. In practice, the two aforementioned components, as part of an actuator and valve linkage, can remove a bottleneck that exists in some assembly processes for turbochargers, which, in turn, may increase production throughput.

As an example, an assembly can include a turnbuckle component and a rod end component with a socket for receipt of the turnbuckle component. In such an example, the turnbuckle component and the rod end component may be aligned with respect to each other and then fixed (e.g., via welding or another fixation process).

As an example, a turnbuckle component can include a bore for receipt of a rod where an adjustment mechanism allows for linear adjustment of the rod with respect to the turnbuckle component. As to an adjustment mechanism, a bore of the turnbuckle component and a surface of the rod may include complimentary threads (e.g., complimentary female/male threads). In such an example, rotation of the rod translates the rod along its longitudinal axis with respect to the turnbuckle component.

As to a locking mechanism to lock the rod with respect to the turnbuckle component, a nut may be provided that can rotate about the threads of the rod to contact a surface of the turnbuckle component and apply a force that is carried to threads of the rod as received by threads of the bore of the turnbuckle component to thereby bind the complimentary threads. Where the bore of the turnbuckle component is a through bore, such a nut may be located adjacent to either end of the bore and where the bore of the turnbuckle component is a partial bore, such a nut may be located adjacent to the open end of the bore. As another example, a locking screw disposed in a turnbuckle component may be provided that contacts the rod to secure it in the turnbuckle component.

As an example, a rod for coupling to a turnbuckle component may be translatable by an actuator. As an example, a linear actuator may be an actuator that can cause movement of a component along an axis in response to a control signal, which may be a force, a power signal, etc. A linear actuator may be a mechanical, hydraulic, pneumatic, electro-mechanical or other type of linear actuator. As an example, an electro-mechanical linear actuator may include a rotary element configured to rotate responsive to a control signal where its rotation displaces a linear element. As a more specific example, a linear actuator may include a lead screw with threads that act as a continuous ramp such that a small rotational force (e.g., via an electric motor) can accomplish movement of a load over a corresponding distance.

As an example, a rod end component may be coupled to a wastegate valve control arm such that translational movement of the rod end component causes rotational movement of the wastegate valve control arm about a pivot axis. In such an example, where the rod end component is fixed to a turnbuckle component coupled to an actuator, the actuator may control translational movement of the rod end component and hence rotational movement of the wastegate valve control arm about its pivot axis.

As an example of a translational-to-rotational coupling between a rod end component and a wastegate valve control arm, one component may include a peg (e.g., a stem) and the other component may include an aperture that receives the peg. For example, a wastegate valve control arm may include a peg and a rod end component may include an aperture. In such an example, as the rod end component translates it exerts a force on the peg of the wastegate valve control arm. As the coefficient of friction is relatively low between a surface of the peg and a surface of the rod end component that defines the aperture, the peg can rotate with respect to the aperture as the translational movement of the rod end component causes the wastegate valve control arm to pivot about its pivot axis. In turn, pivoting of the wastegate valve control arm causes a plug to move from an open position to a closed position and vice versa with respect to a wastegate port. As to a plug (e.g., cover) to plug (e.g., cover) a wastegate port, it may be a poppet, a clapper or other type of plug (e.g., cover).

As an example, a wastegate valve may be an internal wastegate valve that is internal to a turbine housing. Such a valve may include a plug arm that carries a plug and include a shaft portion that is rotatably supported by a bushing seated in an opening in a wall of the turbine housing. Such an arrangement may include features that act to seal the shaft, the bushing and the housing from exhaust leaks. A wastegate valve mechanism may include a crank mechanism or a crank assembly (e.g., consider a control arm that pivots about a pivot axis to control opening and closing of a wastegate valve).

As an example, various alignment tools may provide for positioning a turnbuckle component with respect to a rod end component. Once positioning achieves a suitable alignment of the two components, a welding tool may provide for welding the two components to thereby fix their alignment. As an example, a welding tool may be a laser welding tool that can direct a laser beam to a surface of one of the components or to surfaces of both of the components. Such a welding tool may be, for example, a fiber laser welding tool.

Below, an example of a turbocharged engine system is described followed by various examples of components, assemblies, methods, etc.

Figure 1:
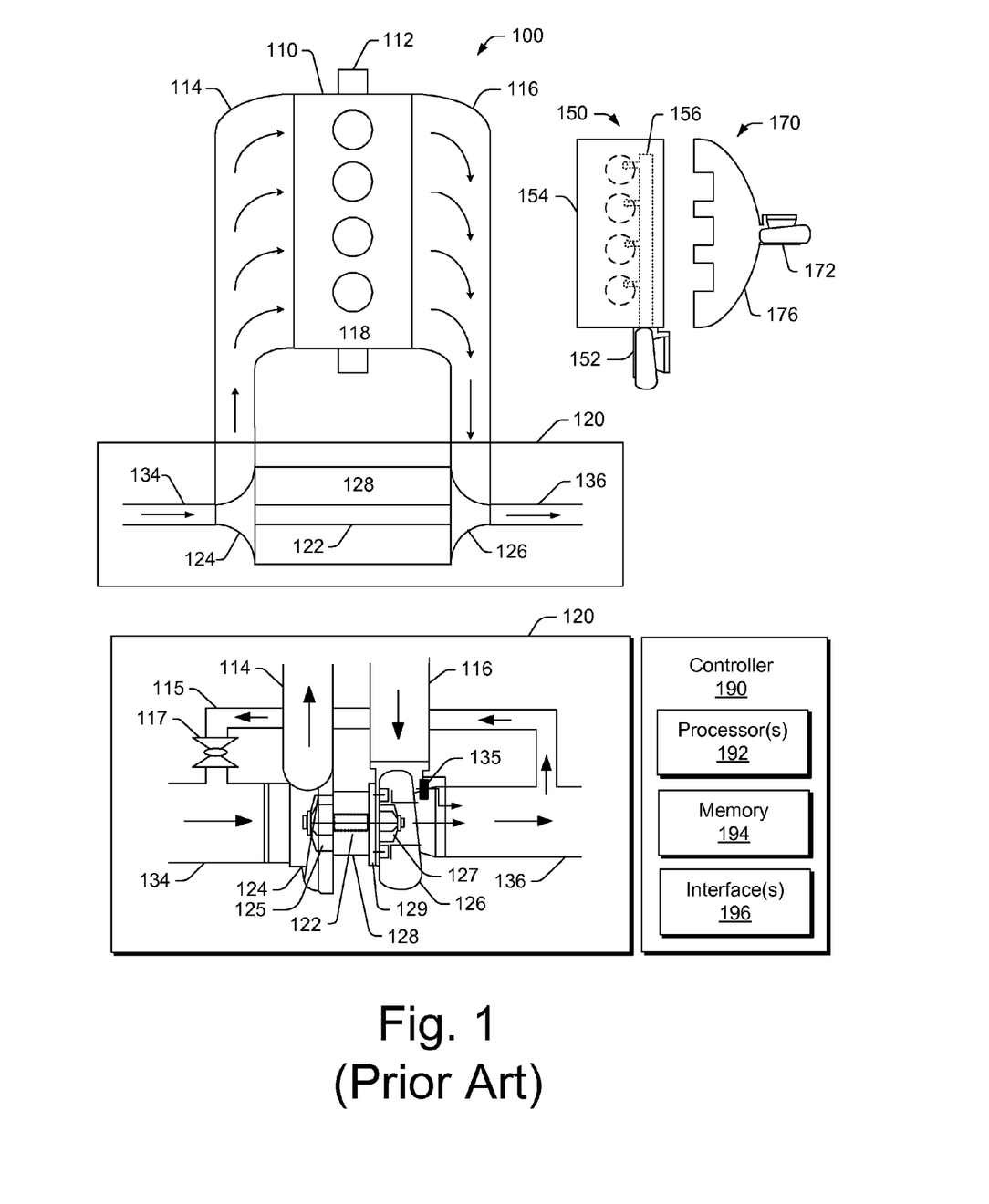
FIG. 1 is a diagram of a turbocharger and an internal combustion engine along with a controller.

Turbochargers are frequently utilized to increase output of an internal combustion engine. Referring to FIG. 1, a conventional system 100 includes an internal combustion engine 110 and a turbocharger 120. The internal combustion engine 110 includes an engine block 118 housing one or more combustion chambers that operatively drive a shaft 112 (e.g., via pistons). As shown in FIG. 1, an intake port 114 provides a flow path for air to the engine block 118 while an exhaust port 116 provides a flow path for exhaust from the engine block 118.

The turbocharger 120 acts to extract energy from the exhaust and to provide energy to intake air, which may be combined with fuel to form combustion gas. As shown in FIG. 1, the turbocharger 120 includes an air inlet 134, a shaft 122, a compressor housing 124 for a compressor wheel 125, a turbine housing 126 for a turbine wheel 127, another housing 128 and an exhaust outlet 136. The housing 128 may be referred to as a center housing as it is disposed between the compressor housing 124 and the turbine housing 126. The shaft 122 may be a shaft assembly that includes a variety of components. The shaft 122 may be rotatably supported by a bearing system (e.g., journal bearing(s), rolling element bearing(s), etc.) disposed in the housing 128 (e.g., in a bore defined by one or more bore walls) such that rotation of the turbine wheel 127 causes rotation of the compressor wheel 125 (e.g., as rotatably coupled by the shaft 122).

In the example of FIG. 1, a variable geometry assembly 129 is shown as being, in part, disposed between the housing 128 and the housing 126. Such an assembly may include vanes or other components to vary geometry of passages that lead to a turbine wheel space in the turbine housing 126. As an example, a variable geometry compressor unit may be provided.

In the example of FIG. 1, a wastegate valve (or simply wastegate) 135 is positioned proximate to an exhaust inlet of the turbine 126. The wastegate valve 135 can be controlled to allow exhaust from the exhaust port 116 to bypass the turbine 126. Further, an exhaust gas recirculation (EGR) conduit 115 may be provided, optionally with one or more valves 117, for example, to allow exhaust to flow to a position upstream the compressor wheel 125.

FIG. 1 also shows an example arrangement 150 for flow of exhaust to an exhaust turbine housing 152 and another example arrangement 170 for flow of exhaust to an exhaust turbine housing 172. In the arrangement 150, a cylinder head 154 includes passages within to direct exhaust from cylinders to the turbine housing 152 while in the arrangement 170, a manifold 176 provides for mounting of the housing 172, for example, without any separate, intermediate length of exhaust piping. In the example arrangements 150 and 170, the turbine housings 152 and 172 may be configured for use with a wastegate, variable geometry assembly, etc.

In FIG. 1, an example of a controller 190 is shown as including one or more processors 192, memory 194 and one or more interfaces 196. Such a controller may include circuitry such as circuitry of an engine control unit (ECU). As described herein, various methods or techniques may optionally be implemented in conjunction with a controller, for example, through control logic. Control logic may depend on one or more engine operating conditions (e.g., turbo rpm, engine rpm, temperature, load, lubricant, cooling, etc.). For example, sensors may transmit information to the controller 190 via the one or more interfaces 196. Control logic may rely on such information and, in turn, the controller 190 may output control signals to control engine operation. The controller 190 may be configured to control lubricant flow, temperature, a variable geometry assembly (e.g., variable geometry compressor or turbine), a wastegate (e.g., via an actuator), an electric motor, or one or more other components associated with an engine, a turbocharger (or turbochargers), etc.

Figure 2:
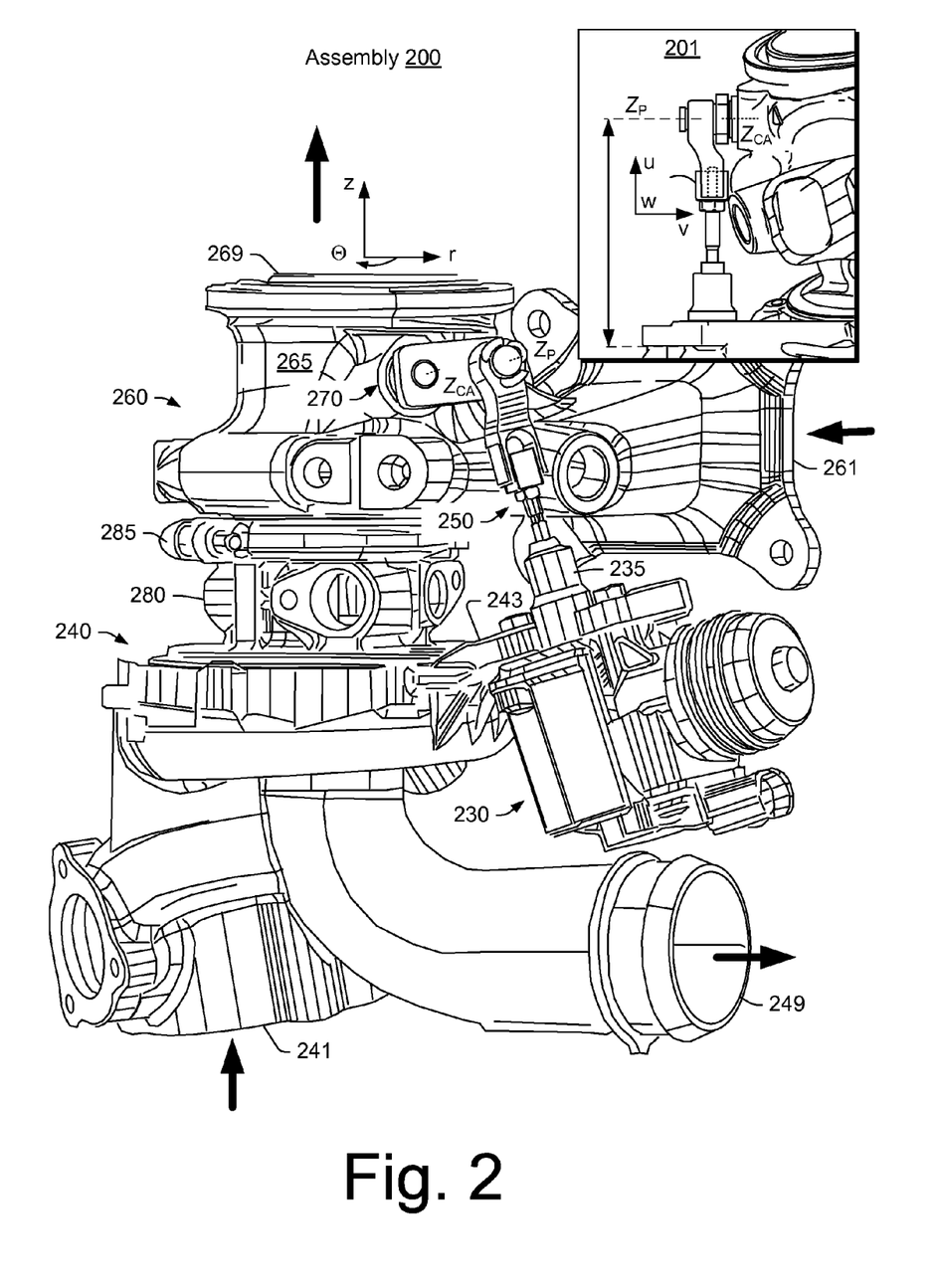
FIG. 2 is a perspective view of an example of a turbocharger assembly (e.g., or system) with respect to a cylindrical coordinate system with an inset view with respect to a Cartesian coordinate system.

FIG. 2 shows an example of an assembly 200 that includes an actuator 230, a compressor assembly 240, a linkage 250, a turbine assembly 260, a wastegate valve mechanism 270 and a center housing 280. The assembly 200 may be described with respect to a cylindrical coordinate system (r, z, Θ) where a longitudinal axis is defined by a rotational axis of a compressor wheel of the compressor assembly 240 and a turbine wheel of the turbine assembly 260 (e.g., attached to a shaft supported by a bearing system disposed in the center housing 280). FIG. 2 also shows, in an inset 201, a Cartesian coordinate system (u, v, w), for example, to facilitate description of the linkage 250. Further, a peg axis $Z_P$ and a control arm pivot axis $Z_{CA}$ are also shown in FIG. 2, both of which are involved where movement of the linkage 250 acts to control a wastegate valve via the wastegate control mechanism 270. As an example, the peg axis $Z_P$ and the control arm pivot axis $Z_{CA}$ may be substantially parallel and offset (e.g., the peg axis $Z_P$ may be at a fixed radial distance from the control arm pivot axis $Z_{CA}$).

In the example of FIG. 2, the compressor assembly 240 includes an air inlet 241 and an air outlet 249 as well as a mount for mounting the actuator 230. In the example of FIG. 2, the turbine assembly 260 includes an exhaust inlet 261, a turbine housing 265 and an exhaust outlet 269. As shown, the turbine assembly 260 may be clamped to the center housing 280 via a clamp 285, which may be a v-band clamp. Accordingly, the turbine assembly 260 may be rotated with respect to the center housing 280 (e.g., in an angle Θ of the cylindrical coordinate system) and then held in alignment via the clamp 285. As the actuator 230 is mounted to the compressor assembly 240 (e.g., via a mount 243) and the compressor assembly 240 is attached to the center housing 280, rotation of the turbine assembly 260 with respect to the center housing 280 can alter positional relationships of components of the linkage 250. For example, in FIG. 2, the actuator 230 includes a boss 235 that extends along a u-axis in the Cartesian coordinate system. Rotation of the turbine assembly 260 about the z-axis of the cylindrical coordinate system alters at least angle (e.g., in Θ) between the boss 235 and the wastegate valve mechanism 270 (e.g., by altering position of the u-axis with respect to the cylindrical coordinate system).

Figure 3:
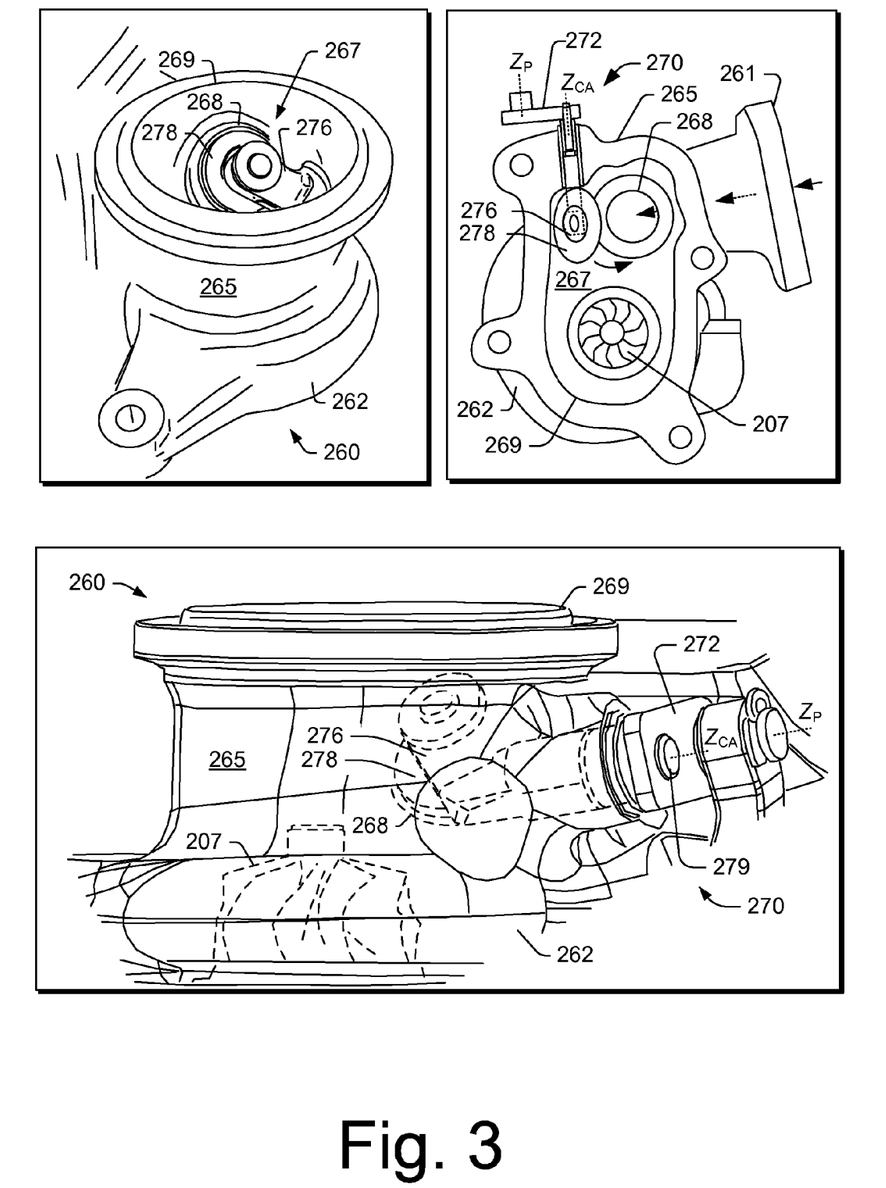
FIG. 3 is a series of views of an example of an internal wastegate.

FIG. 3 shows views of the assembly 200 that focus on the turbine assembly 260 and various wastegate valve components 272, 276 and 278 of the wastegate valve mechanism 270. As shown, the turbine assembly 260 includes a wall 262 that defines an exhaust volute for directing exhaust to a turbine wheel 207 and also includes a wastegate port 268. In the example of FIG. 3, the wastegate port 268 allows exhaust entering the turbine assembly 260 via the exhaust inlet 261 to bypass the turbine wheel 207 and exit via the exhaust outlet 269.

As shown in the example of FIG. 3, the wastegate valve mechanism 270 includes a control arm 272 that is connected to a poppet arm 276 which is connected to a poppet 278. The poppet arm 276 includes a shaft portion that includes an end 279 that extends through an opening in a wall of the turbine housing 265. The opening may include a bushing and optionally a seal or seals to seal exhaust within an exhaust space 267 defined by the turbine housing 265.

In the example of FIG. 3, when the poppet 278 is in a closed position by being seated to cover the port 268, exhaust flows to the turbine wheel 207 and to the exhaust space 267 and out through the exhaust outlet 269. However, when the poppet 278 is in an open position, exhaust can flow to the exhaust space 267, without flowing to the turbine wheel 207, and out through the exhaust outlet 269. Intermediate positions between closed and fully open may be achieved through application of force to the control arm 272 to move the control arm 272.

Figure 4:
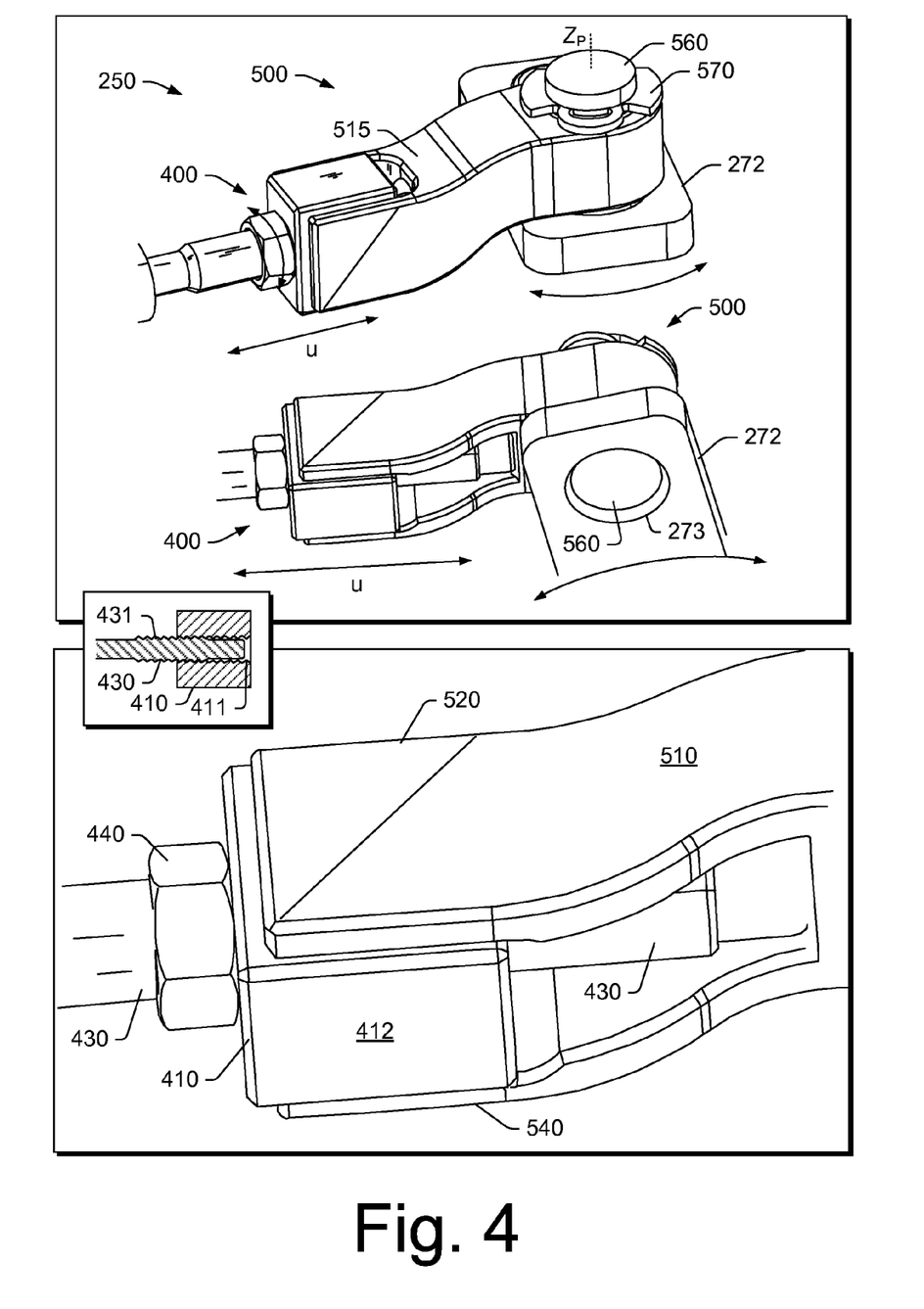
FIG. 4 is a series of views of an example of a linkage.

FIG. 4 shows various views of the linkage 250 of the assembly 200 of FIG. 2 as including a component assembly 400 and a component assembly 500. In the example of FIG. 4, the component assembly 400 includes a turnbuckle component 410, a rod 430 and a nut 440 and the component assembly 500 includes a rod end 510, a peg 560 and a locking ring 570 for locking the rod end 510 to the peg 560 while allowing for rotation of the rod end 510 with respect to the peg 560. In the example of FIG. 4, the peg 560 is received by an opening 273 (see, e.g., peg axis $Z_P$, also shown in FIGS. 2 and 3) of the control arm 272 (see, e.g., pivot axis $Z_{CA}$ of FIGS. 2 and 3). A peg, such as the peg 560, may be a single or multi-piece component. In the example of FIG. 4, at least some portions of the peg 560 have a cylindrical shape.

As to the rod end 510, it includes two extensions 520 and 540 that form a socket that can receive the turnbuckle component 410. The turnbuckle component 410 may be shaped as a cube with sides (see, e.g., side 412) where two of its sides (e.g., being planar and parallel) can contact respective inner sides of the extensions 520 and 540 (e.g., which may be planar and parallel). As an example, the turnbuckle component 410 may be a hexahedron and optionally a regular hexahedron. Contact between the turnbuckle component 410 and the extensions 520 and 540 of the rod end 510 may be achieved via a press fit where the press fit is not too tight such that it allows for positioning of the turnbuckle component 410 with respect to the rod end 510. For example, the press fit may provide for a fit force that can be overcome by finger manipulation of the turnbuckle component 410 and the rod end 510 (e.g., to achieve a desirable alignment therebetween).

In the example of FIG. 4, the turnbuckle component 410 includes a bore for receipt of the rod 430, which may extend through the turnbuckle component 410. As shown, the rod end 510 can include extensions 520 and 540 with lengths sufficient to accommodate a portion of the rod 430 that extends through the turnbuckle component 410. Further, the rod end 510 may include an asymmetry in that the extensions 520 and 540 have an outward facing connecting wall 515 that acts to define a three-walled chamber for receipt of the portion of the rod 430 that extends through the turnbuckle component 410. In such an example, the chamber may be open on an inward facing side of the rod end 510 (e.g., the wall 515 may cover an end of the rod 430 to protect from engine compartment debris, grime, etc., to facilitate any adjustments such as re-alignment adjustments for calibration or re-calibration).

In the example of FIG. 4, the linkage 250 is a turnbuckle linkage as, even when the turnbuckle component 410 is fixed (e.g., via welding) to the rod end 510, linear adjustments may be made via the rod 430 (e.g., along a direction u). However, welding may occur in some instances between a rod and a socket to fix a relationship between a rod and a socket (e.g., where calibration is ensured, re-calibration unlikely, etc.). In the example of FIG. 4, the nut 440 may provide for locking a relationship between the rod 430 and the turnbuckle component 410 whether or not the turnbuckle component 410 is fixed to the rod end 510. FIG. 4 shows a cross-sectional view of the turnbuckle component 410 as including a threaded bore 411 and of the rod 430 as including a threaded portion 431. Accordingly, rotation of the rod 430 with respect to the turnbuckle component 410 adjusts the position of the rod 430 with respect to the turnbuckle component 410.

In the example of FIG. 4, a bore, such as the bore 411, may be considered to be a socket for receipt of a rod. Where a linkage does not involve rotation of a rod with respect to a socket, the shape of the rod and the socket may have a shape other than cylindrical. For example, a rod may have a polygonal shape that cooperates with a polygonal shape of a socket.

As an example, a turnbuckle may allow for disassembly. For example, consider disassembly to remove an actuator (e.g., the actuator 230) from a turbocharger without having to decouple the turbocharger from any intake, exhaust or other components (e.g., of an internal combustion engine). Such an approach can provide for quick changes in the field, which may, in turn, reduce servicing costs. Further, if re-calibration is desired, a turnbuckle may allow for adjustments related to re-calibration. As an example, where re-calibration is unlikely (e.g., either due to lifetime, operational conditions, assembly, etc.), a method may include direct welding of a rod in a socket. In such an example, a rod may be welded directly to a rod end that has an integral socket or a rod end with a rod may be welded directly to a socket of a component linked to an actuator.

As an example, a turnbuckle component may be a polyhedral component configured for receipt by a socket of a rod end, for example, defined by extensions of the rod end. As an example, a turnbuckle component may have a spheroidal shape where a rod end includes a socket for receipt of the spheroidal shape (e.g., where some degrees of freedom are limited). As an example, a linkage may include a turnbuckle component and a rod end where a socket formed by extensions of the rod end receives the turnbuckle component and acts to at least partially limit movement of the turnbuckle component, which may facilitate alignment of the linkage and fixation (e.g., welding) of the turnbuckle component with respect to the rod end to form part of a control mechanism. In such an example, turnbuckle type of adjustments (e.g., linear adjustments) may remain possible (e.g., for a threaded rod received by a threaded bore of the turnbuckle component). Accordingly, after fixation (e.g., welding), a linkage may be a turnbuckle linkage.

Figure 5:
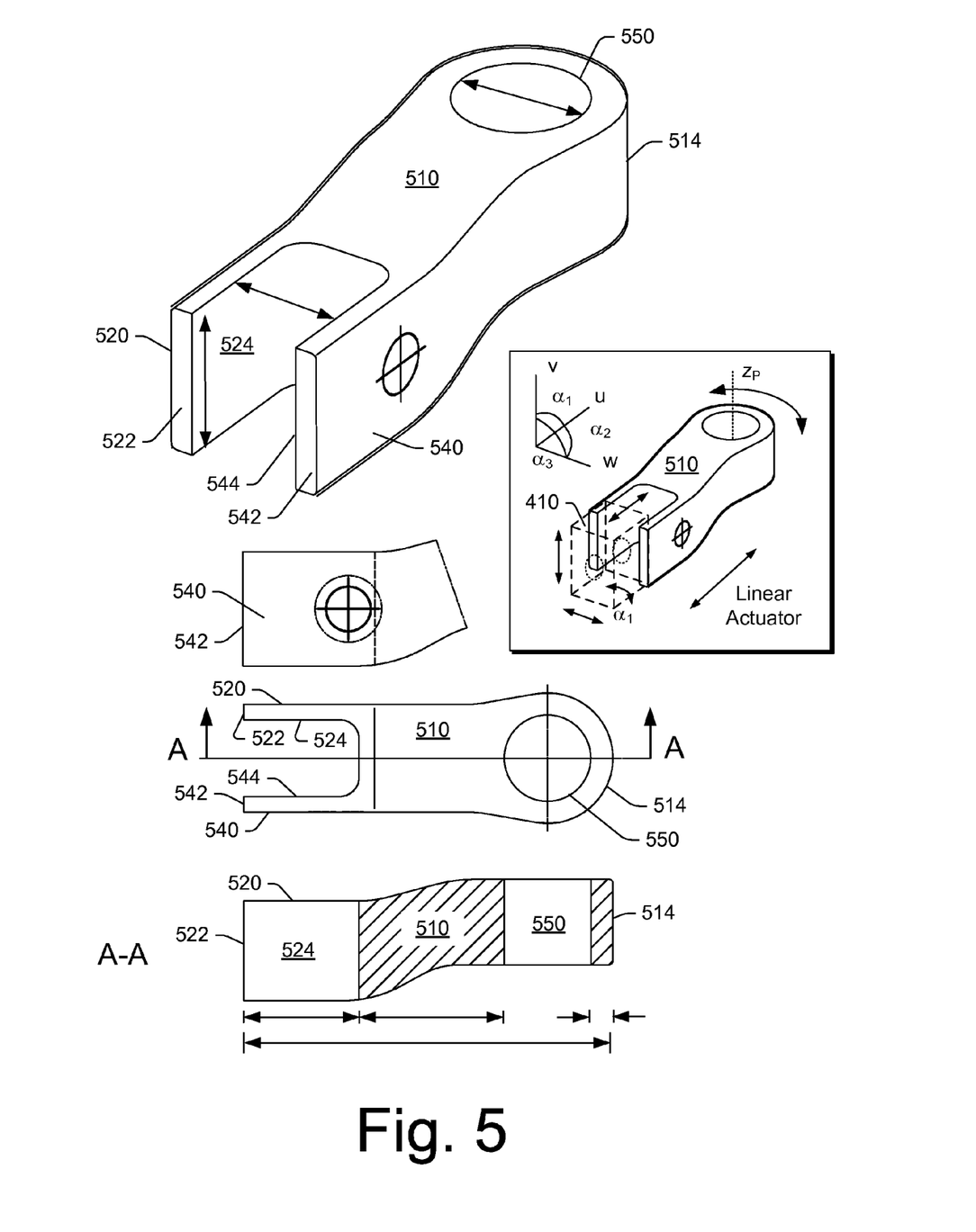
FIG. 5 is a series of views of an example of a rod end.

FIG. 5 shows various views of the rod end 510 of FIG. 4, however, as an example, without the wall 515 shown in the example of FIG. 4. As shown in FIG. 5, the extensions 520 and 540 include ends 522 and 542 as well as inner surfaces 524 and 544, respectively. Further, the rod end 510 includes a cylindrical wall 550 that defines an opening for receipt of a peg, stem, etc., of a control arm (see, e.g., the control arm 272). In the example of FIG. 5, the rod end 510 has a length that extends between the ends 522 and 524 and an end surface 514. Various arrows show dimensions, for example, such as overall length, length and spacing of the extensions 520 and 540, diameter of the cylindrical wall 550, spacing between the socket formed by the extensions 520 and 540 and the cylindrical wall 550, height of the extensions 520 and 540, etc. A cross-sectional view is shown along a line A-A which indicates that the rod end 510 may be formed from a solid material, for example, as a unitary piece.

In FIG. 5, a perspective view of the rod end 510 is shown with respect to the turnbuckle component 410 (dashed line) as partially received by the socket formed by the extensions 520 and 540. A Cartesian coordinate system (u, v, w) is also shown along with angles $\alpha_1$, $\alpha_2$ and $\alpha_3$ where, for example, surfaces of the turnbuckle component 410 may lie in u,v-planes, u,w-planes, and v,w-planes. Various planes may be orthogonal or parallel to each other. In the example of FIG. 5, the inner surfaces 524 and 544, which may be planar and parallel surfaces, provide for positioning and alignment of parallel planar surfaces of the turnbuckle component 410 (e.g., which may include rotation in the angle $\alpha_1$). In such a manner, the rod end 510 limits freedom of movement (e.g., reduction in degrees of freedom) of the turnbuckle component 410. For example, as shown, movement of the turnbuckle component 410 with respect to the rod end 510 may occur along the u-axis, the v-axis as well as the angle $\alpha_1$; noting that the extensions of the rod end 510 limit rotation about angles $\alpha_2$ and $\alpha_3$ as well as along the w-axis. However, as fixation of the turnbuckle component 410 to the rod end 510 allows a linkage to be a turnbuckle linkage, adjustments may still occur with respect to a degree of freedom, for example, defined by the rod 430 received by the bore 411 of the turnbuckle component 410; noting that fixation of the turnbuckle component 410 to the rod end 510 (e.g., via welding or other fixation process) eliminates freedom of movement between the turnbuckle component 410 and the rod end 510. As mentioned, where calibration is ensured, re-calibration unlikely, etc., a process may include fixing a rod and a socket, for example, via welding (e.g., consider the rod 430 welded in the bore 411 of the turnbuckle component 410).

As an example, a rod end includes extensions that form a socket for guiding a turnbuckle component where such guiding may assist with alignment of the rod end and turnbuckle component as part of a linkage (e.g., an actuator and valve linkage). As shown in the example of FIG. 5, guiding also guides the turnbuckle component 410 for movement of the rod end 510 about a peg axis ($Z_P$) (e.g., for a peg received in the opening defined by the cylindrical wall 550). Where a rod is received by a bore of a turnbuckle component and the rod is connected to (e.g., part of) a linear actuator, rotation of the rod end 510 about the peg axis ($Z_P$) may be limited (e.g., less than ten degrees of rotation).

As mentioned, adjustments may include rotation of a turbine housing with respect to another component to which an actuator is mounted, for example, adjustments referenced in the cylindrical coordinate system (r, z, Θ). Where a rod extends linearly outwardly from the actuator, rotation of the turbine housing may cause some rotation of a rod end about a peg axis (see, e.g., the rod end 510 and peg axis $Z_P$). As mentioned with respect to the example of FIG. 2, a clamp may be provided to hold an alignment between a turbine housing and another component (see, e.g., the clamp 285 of FIG. 2).

Figure 6:
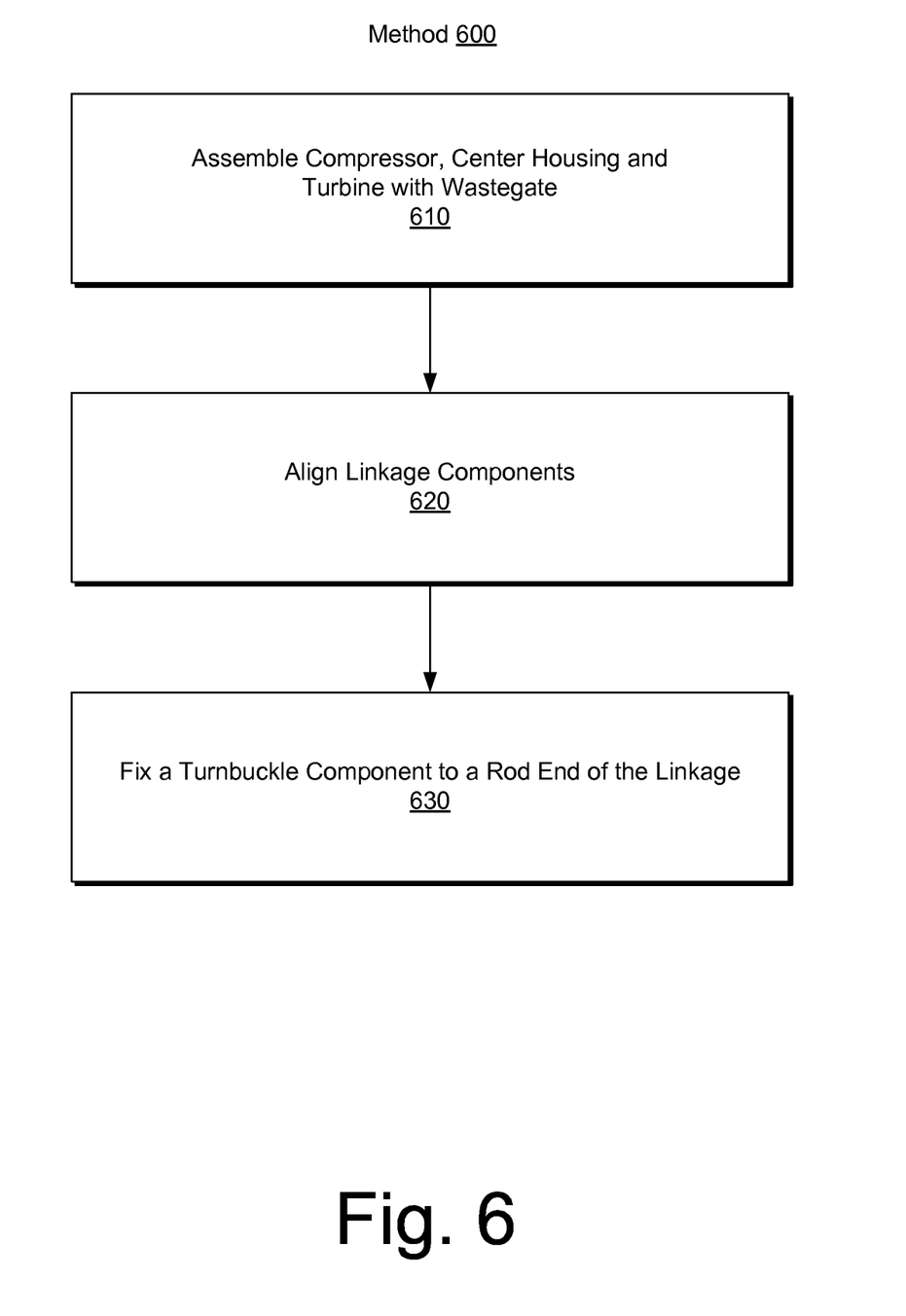
FIG. 6 is a block diagram of an example of a method.

FIG. 6 shows an example of a method 600 that includes an assembly block 610, an alignment block 620 and a fixation block 630. As an example, the assembly block 610 includes assembling a compressor housing and a turbine housing to a CHRA where an actuator is mounted to the assembly for actuating a control mechanism of a wastegate of the turbine housing via a linkage that includes a turnbuckle component and a rod end. In such an example, the alignment block 620 includes aligning various components of the linkage to achieve a desired alignment and the fixation block 630 includes fixing the turnbuckle component to the rod end to maintain the desired alignment (e.g., for operation of the assembly). Such a method may further include a disassembly block whereby, for a rotatable rod disposed in a turnbuckle component, rotation of the rod with respect to the turnbuckle component allows for removal of the rod, which may be attached to an actuator (see, e.g., the actuator 230 of FIG. 2 and linkage 250). In such an example, removal of an actuator may be possible while maintaining a turbocharger within an engine compartment (e.g., consider unbolting the actuator 230 of FIG. 2 from the mount 243 and then rotating a rod of the linkage 250 to free the rod for removal of the actuator 230 from the compressor housing 240).

Figure 7:
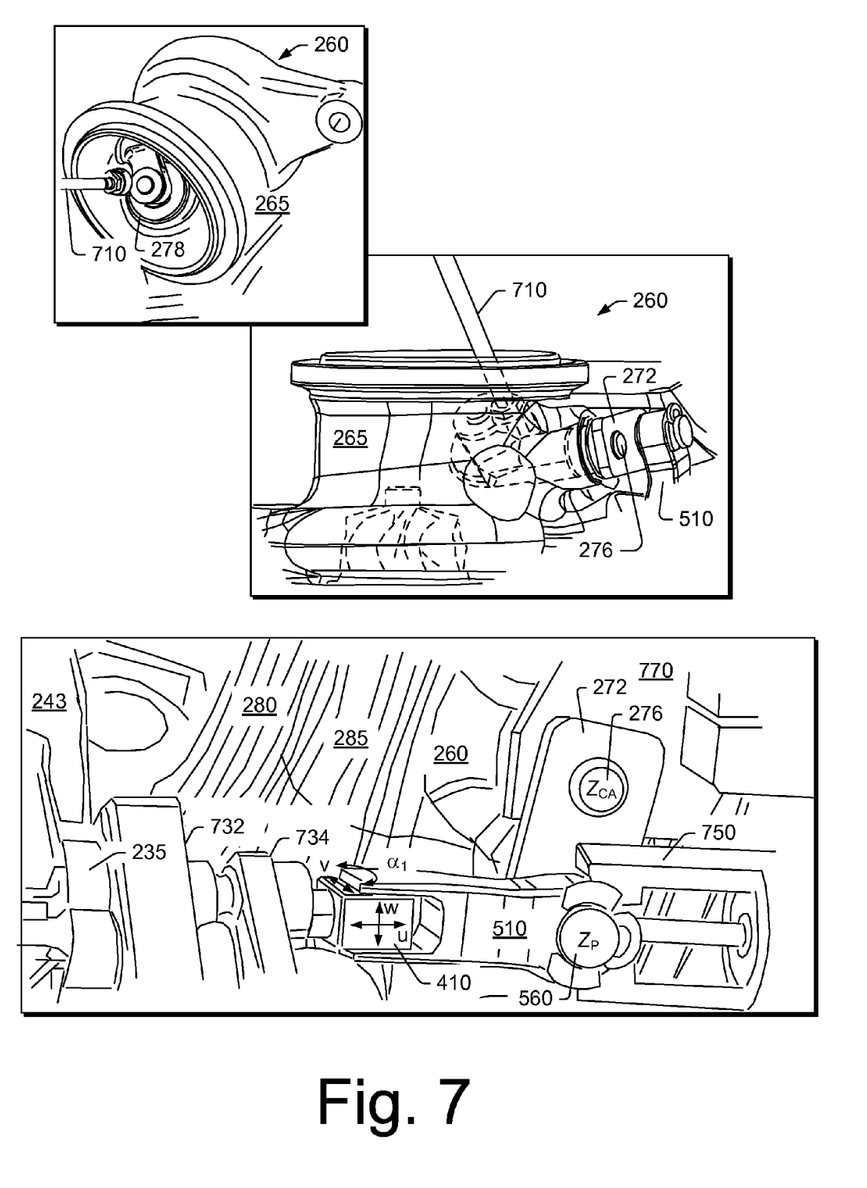
FIG. 7 is a series of views of examples of positioning tools.

FIG. 7 shows various views of examples of positioning tools 710, 732, 734, 750 and 770 for positioning various components of an assembly such as the assembly 200 of FIG. 2. As an example, the positioning tool 710 includes a rod with an end configured to contact the poppet 278, the poppet arm 276 or both to maintain a position of the poppet 278 and hence the poppet arm 276. In such an example, the positioning tool 770 may act as a spacer for positioning the shaft portion of the poppet arm 276 within an opening of the turbine housing 265 (e.g., a spacer fork insertable between the control arm 272 and the turbine housing 265). Further, the positioning tool 750 may be a pusher tool to ensure positioning of the rod end 510 against the peg 560 (e.g., with the peg 560 seated in an opening of the rod end 510) by applying force to the end surface 514 of the rod end 510.

In the example of FIG. 7, the Cartesian coordinate system (u, v, w) is show along with the angle $\alpha_1$. As shown, movement of the turnbuckle component 410 with respect to the rod end 510 may occur along the u-axis, the v-axis as well as the angle $\alpha_1$. In the example of FIG. 7, the extensions of the rod end 510 limit rotation about angles $\alpha_2$ and $\alpha_3$ (see, e.g., FIG. 5) as well as along the w-axis.

As an example, a method can include positioning a poppet with respect to a port, positioning a shaft portion of a poppet arm to achieve an axial spacing for a control arm attached to the shaft portion where the control arm can be rotated by a linkage to an actuator to pivot the shaft portion of the poppet arm and thereby move the poppet between an open and a closed position with respect to the port. Such a method may further include applying force to an end surface of a rod end (e.g., using a pusher tool) where the rod end is coupled to the control arm. In such a method, the axial spacing may provide for alignment of a rod end with a rod of an actuator (e.g., as set in a turnbuckle component) and the applying force to the rod end may act to maintain that alignment for purposes of a fixation process that fixes the rod end with respect to the rod (e.g., by welding the rod end to a turnbuckle component).

As another example, the positioning tools 732 and 734 are configured to contact the actuator 230 at or near the boss 235. For example, the positioning tool 732 may be a pinching tool for aligning the actuator 230 and the rod 430 that extends from the actuator 230 to ensure their concentricity. The positioning tool 732 may further help to center the positioning tool 734, which may optionally include a forked extension (not shown) that can extend to the peg 560 to provide for aligning the rod 430 with an axis of the peg 560 (e.g., along the direction u).

As an example, a method can include positioning of a linkage to achieve a desired alignment of components while a turbine housing is rotatable about a center housing (e.g., or a CHRA). For example, a v-band clamp may be loose enough to allow for such rotation and after a desired alignment is achieved (e.g., optionally through some amount of rotation), the v-band clamp may be tightened to lock the orientation of the turbine housing with respect to the center housing (e.g., or CHRA).

Figure 8:
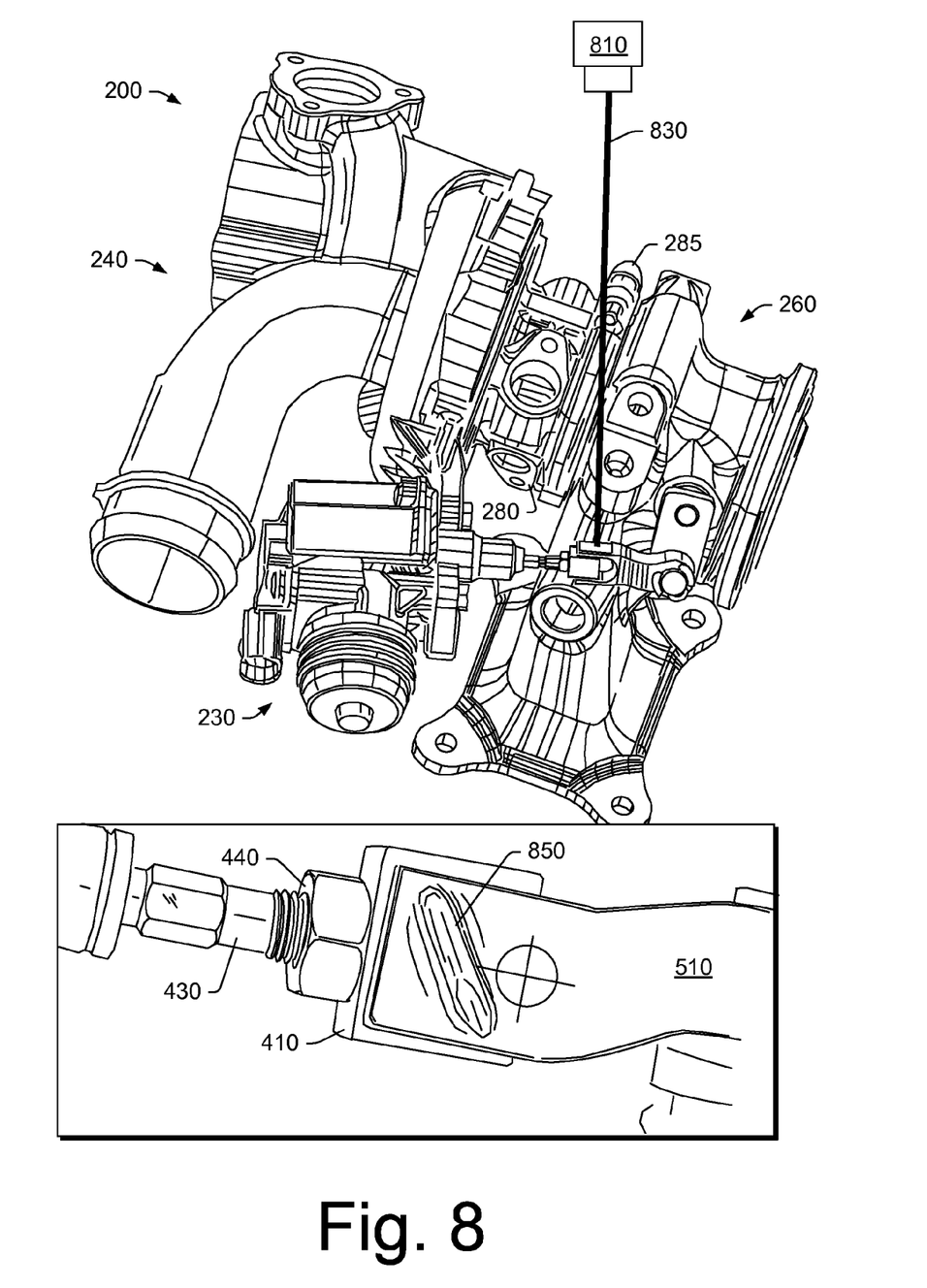
FIG. 8 is a perspective view of a laser welder with respect to a linkage of a turbocharger assembly and an enlarged view of a linkage with indicia of welding.

FIG. 8 shows a view of the assembly 200 of FIG. 2 along with a laser welding tool 810 that can emit and direct a laser beam 830 (e.g., a free beam, a fiber guided beam, etc.). In the example of FIG. 8, the welding tool 810 emits and directs the laser beam 830 to a surface of the rod end 510 to impart a weld, as evidenced by the resulting weld mark 850. In such a manner, the positional relationship of the turnbuckle component 410 is fixed with respect to the rod end 510.

As an example, an output window (e.g., lens) of the laser welding tool 810 may be directed substantially perpendicular to one of the extensions 520 or 540 of the rod end 510 (e.g., at a distance of about 30 cm). Heat energy delivered by the laser beam 830 emitted by the laser welding tool 810 can cause melting of metal of the rod end 510 where solidification of the melted metal acts to weld the rod end 510 to the turnbuckle component 410. As an example, laser welding may be applied to both extensions 520 and 540 of the rod end (e.g., by directing a laser beam to each extension).

As mentioned, in an example where re-calibration is unlikely (e.g., either due to lifetime, operational conditions, assembly, etc.) or where calibration may be ensured (e.g., via proper machining, alignment, etc.), a method may include welding of a rod in a socket (e.g., consider welding of the rod 430 in the bore 411 of the component 410). In such an example, a rod may be welded directly to a rod end that has an integral socket or a rod end with a rod may be welded directly to a socket of a component linked to an actuator. Other configurations may optionally be used to create a link from two or more components where the link can be aligned and then subject to welding to weld two of the two or more components to fix the link (e.g., as a fixed, aligned link).

A laser welding operation may include, for example, use of a fiber laser. As an example, a commercial single-mode fiber laser may provide of a few kilowatts or more. A feed fiber diameter may be in a range, for example, from tens of micrometers to hundreds of micrometers. As an example, laser energy may be randomly polarized with a 1070 to 1080 nm emission wavelength and delivered via an optical fiber fed by multiple laser units in either CW or modulated modes.

As an example, a system can include a linkage that includes a turnbuckle component fixed between extensions of a rod end, a turbine assembly that includes a rotatable wastegate poppet arm connected to a pivotable wastegate valve control arm coupled to the rod end of the linkage by a peg, and an actuator that includes a translatable rod connected to the turnbuckle component of the linkage to pivot the wastegate valve control arm and rotate the wastegate poppet arm. In such an example, the linkage can include a weld (e.g., a welded joint) between the turnbuckle component and at least one of the extensions of the rod end.

As an example, a system can include a pivotable wastegate valve with a peg, where a rod end includes a cylindrical wall that defines an opening, and where the peg is received by the opening.

As an example, a wastegate poppet arm can include a rotational axis (e.g., for a shaft portion), a wastegate valve control arm can include a pivot axis parallel to the rotational axis of the wastegate poppet arm and a rod of an actuator can include a translational axis. In such an example, translation of the rod along its translational axis can move a linkage to pivot the wastegate valve control arm about its pivot axis and thereby rotate the wastegate poppet arm about its rotational axis (e.g., to open and close a wastegate valve).

As an example, a turnbuckle component can include a threaded bore and a rod can include a threaded portion having threads complimentary to threads of the threaded bore. In such an example, rotation of the threads of the rod with respect to the threads of the turnbuckle can translate the rod with respect to the turnbuckle (e.g., to provide a turnbuckle linkage).

As an example, a rod end can include two extensions, for example, where the two extensions are planar and parallel extensions. In such an example, a turnbuckle can include two planar and parallel sides where each of the sides contacts a respective one of the two planar and parallel extensions of the rod end.

As an example, a turnbuckle component may be shaped as hexahedron (e.g., it may be a hexahedron, optionally a regular hexahedron). In such an example, two sides of the hexahedron contact the extensions of the rod end.

As an example, extensions of a rod end can form a socket in which a turnbuckle component may be fixed. Such fixation may occur via welding, which may be achieved by a heat energy welding process, chemical welding process (e.g., appropriate epoxy) or other welding process.

As an example, a system can include a compressor housing that includes an actuator mount. In such an example, the system may further include an actuator mounted to the actuator mount where a rod from the actuator (e.g., an actuation element) is connected to a linkage that includes a turnbuckle component and a rod end with extensions that form a socket to receive the turnbuckle component.

As an example, a system can include a poppet connected to a wastegate poppet arm. In such an example, the system may include a turbine assembly that includes a turbine housing with a wastegate port coverable by the poppet. As an example, a poppet can include a flat surface configured to seat against a flat surface surrounding a wastegate port.

As an example, a linkage for a turbocharger can include a hexahedronal turnbuckle component (e.g., that includes a threaded bore to receive a threaded rod of a linear actuator) and a rod end that includes extensions that form a socket for receipt of the hexahedronal turnbuckle component and that includes a coupling feature to couple the rod end to a pivotable control arm. In such an example, the coupling feature may be a peg, an opening, etc. (e.g., a male or a female or a hermaphroditic coupling feature). As an example, a hexahedronal turnbuckle component may be a regular hexahedronal turnbuckle component.

As an example, a method can include threading an actuator rod of a linear actuator into a threaded bore of a turnbuckle component, positioning the turnbuckle component between extensions of a rod end coupled to a wastegate valve control arm of a turbine assembly, directing a laser beam to one of the extensions and laser welding the one of the extensions to the turnbuckle component. Such a method may also include actuating the linear actuator to control a wastegate valve of the turbine assembly.

Although some examples of methods, devices, systems, arrangements, etc., have been illustrated in the accompanying Drawings and described in the foregoing Detailed Description, it will be understood that the example embodiments disclosed are not limiting, but are capable of numerous rearrangements, modifications and substitutions.

What is claimed is:

1. A system comprising:
   a linkage that comprises a turnbuckle component fixed between two planar and parallel extensions of a rod end component;
   a turbine assembly that comprises a rotatable wastegate poppet arm connected to a pivotable wastegate valve control arm coupled to the rod end component of the linkage by a peg; and
   an actuator that comprises a translatable rod connected to the turnbuckle component of the linkage to pivot the wastegate valve control arm and rotate the wastegate poppet arm.

2. The system of claim 1 wherein the linkage comprises a weld between the turnbuckle component and at least one of the extensions of the rod end component.

3. The system of claim 1 wherein the pivotable wastegate valve control arm comprises the peg, wherein the rod end comprises a cylindrical wall that defines an opening, and wherein the peg is received by the opening.

4. The system of claim 1 wherein the wastegate poppet arm comprises a rotational axis, wherein the wastegate valve control arm comprises a pivot axis parallel to the rotational axis of the wastegate poppet arm and wherein the translatable rod comprises a translational axis.

5. The system of claim 1 wherein the turnbuckle component comprises a threaded bore and wherein the translatable rod comprises a threaded portion having threads complimentary to threads of the threaded bore.

6. The system of claim 5 wherein rotation of the threads of the translatable rod with respect to the threads of the turnbuckle component translates the translatable rod with respect to the turnbuckle component.

7. The system of claim 1 wherein the turnbuckle component comprises two planar and parallel sides where each of the sides contacts a respective one of the two planar and parallel extensions of the rod end component.

8. The system of claim 1 wherein the turnbuckle component comprises a hexahedron.

9. The system of claim 8 wherein two sides of the hexahedron contact the extensions of the rod end component.

10. The system of claim 1 wherein the extensions of the rod end form a socket in which the turnbuckle component is fixed.

11. The system of claim 1 further comprising a compressor housing that comprises an actuator mount and wherein the actuator is mounted to the actuator mount.

12. The system of claim 1 further comprising a poppet connected to the wastegate poppet arm.

13. The system of claim 12 wherein the turbine assembly comprises a turbine housing that comprises a wastegate port coverable by the poppet.

14. The system of claim 13 wherein the poppet comprises a flat surface configured to seat against a flat surface surrounding the wastegate port.

15. The system of claim 1 comprising a locking ring that locks the rod end component to the peg.

16. The system of claim 1 wherein the rod end component comprises an outward facing connecting wall that defines in part a three-walled chamber that receives a portion of the translatable rod that extends through the turnbuckle component.

17. A linkage for a turbocharger comprising:
   a hexahedronal turnbuckle component that comprises a threaded bore to receive a threaded rod of a linear actuator; and
   a rod end that comprises two planar and parallel extensions that form a socket for receipt of the hexahedronal turnbuckle component and that comprises a coupling feature to couple the rod end to a pivotable control arm.

18. The linkage of claim 17 wherein the hexahedronal turnbuckle component comprises a hexahedronal turnbuckle component wherein its internal angles are 90 degrees.

\* \* \* \* \*